(12) United States Patent
Höhnke

(10) Patent No.: US 10,162,984 B2
(45) Date of Patent: *Dec. 25, 2018

(54) METHOD OF DESTROYING FILE CONTENTS

(71) Applicant: Fujitsu Technology Solutions Intellectual Property GmbH, München (DE)

(72) Inventor: Thorsten Höhnke, Königsbrunn (DE)

(73) Assignee: Fujitsu Technology Solutions Intellectual Property GmbH (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/838,442

(22) Filed: Dec. 12, 2017

(65) Prior Publication Data

US 2018/0101700 A1    Apr. 12, 2018

Related U.S. Application Data

(62) Division of application No. 14/781,977, filed as application No. PCT/EP2015/056759 on Mar. 27, 2015, now Pat. No. 9,858,435.

(30) Foreign Application Priority Data

Apr. 10, 2014  (DE) .................. 10 2014 105 116

(51) Int. Cl.
    *G06F 21/62*    (2013.01)
    *G06F 21/10*    (2013.01)
    *G06F 17/30*    (2006.01)

(52) U.S. Cl.
    CPC .... *G06F 21/6245* (2013.01); *G06F 17/30085* (2013.01); *G06F 17/30117* (2013.01);
    (Continued)

(58) Field of Classification Search
    CPC .......... G06F 21/6245; G06F 17/30085; G06F 17/30117; G06F 21/10; G06F 21/629
    See application file for complete search history.

(56) References Cited

U.S. PATENT DOCUMENTS

| 7,149,893 B1 * | 12/2006 | Leonard | ................. H04L 51/18 |
| | | | 713/154 |
| 8,725,809 B2 * | 5/2014 | Hartselle | .............. G06Q 10/107 |
| | | | 709/204 |

(Continued)

FOREIGN PATENT DOCUMENTS

| EP | 0 999 488 A2 | 5/2000 |
| JP | 06-095949 A | 4/1994 |

(Continued)

OTHER PUBLICATIONS

J. Brown, "Self-deleting Executables—Techniques which allow an executable file to delete itself whilst running," Catch 22.net, Jan. 2012, URL: https://web.archive.og/web/20120420033026/http://www.cath22.net/tuts/self-deleting-executables.

(Continued)

*Primary Examiner* — Saleh Najjar
*Assistant Examiner* — Devin E Almeida
(74) *Attorney, Agent, or Firm* — DLA Piper LLP (US)

(57) ABSTRACT

A method of destroying file contents of a file includes storing the file in a predefined file format, wherein a first part of the algorithm is integrated into a pre-execution header of the file called by an executing program or an executing operating system when the file is opened and a second part of the algorithm is integrated into a second part of the file, called by the first part of the algorithm when the first part of the algorithm is called by the executing program or the executing operating system, and modifying of the integrated algorithm includes modifying a storage structure of the algorithm so that it occurs in changed form after the opening of (Continued)

the file and cannot be recognized as before and storing the modified algorithm in the file.

14 Claims, 1 Drawing Sheet

(52) U.S. Cl.
CPC ............ *G06F 21/10* (2013.01); *G06F 21/629* (2013.01); *G06F 2221/2143* (2013.01)

(56) References Cited

U.S. PATENT DOCUMENTS

| | | | | |
|---|---|---|---|---|
| 8,869,235 | B2* | 10/2014 | Qureshi | .................. H04L 63/20 |
| | | | | 713/150 |
| 9,111,109 | B2* | 8/2015 | Islam | .................. G06F 21/6218 |
| 2003/0126215 | A1* | 7/2003 | Udell | ...................... G06F 21/10 |
| | | | | 709/206 |
| 2005/0091491 | A1* | 4/2005 | Lee | .......................... G06F 21/10 |
| | | | | 713/167 |
| 2009/0007227 | A1 | 1/2009 | Burgess et al. | |
| 2009/0119469 | A1 | 5/2009 | Dellantoni et al. | |
| 2011/0219049 | A1* | 9/2011 | Zaitsev | .................. G06F 3/0623 |
| | | | | 707/822 |
| 2014/0032759 | A1* | 1/2014 | Barton | .................... H04L 67/10 |
| | | | | 709/225 |

FOREIGN PATENT DOCUMENTS

| | | |
|---|---|---|
| JP | 2005-313567 A | 11/2005 |
| JP | 2007-058652 A | 3/2007 |
| JP | 2007-265400 A | 10/2007 |
| JP | 2008-123049 A | 5/2008 |
| JP | 2008-152519 A | 7/2008 |
| WO | 98/58321 A1 | 12/1998 |

OTHER PUBLICATIONS

Japanese Office Action dated Sep. 20, 2016 of corresponding Japanese Application No. 2016-512396 with an English translation.

* cited by examiner

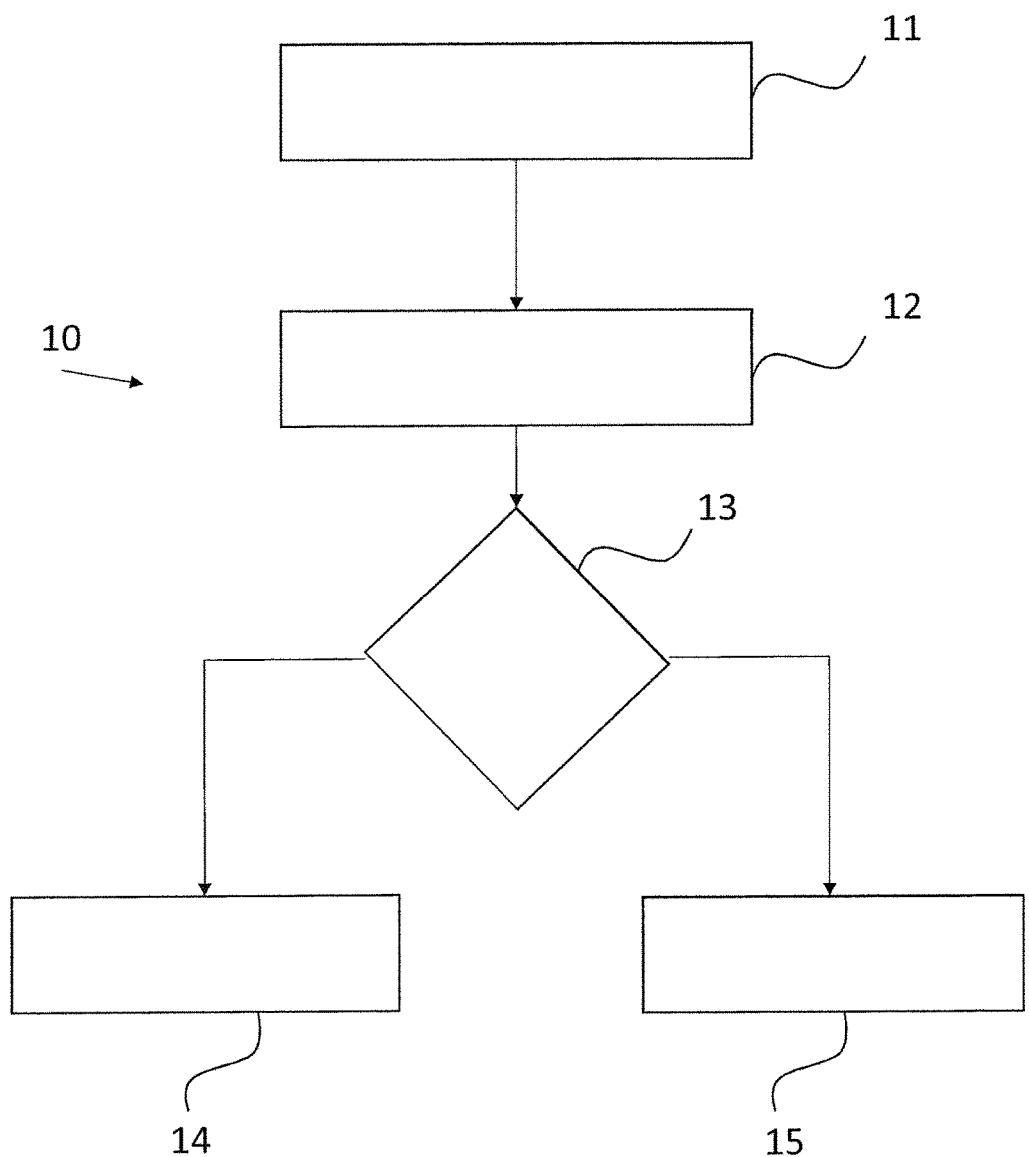

METHOD OF DESTROYING FILE CONTENTS

TECHNICAL FIELD

This disclosure relates to a method of destroying file contents of a file.

BACKGROUND

Security-related data that are stored in files are normally intended to be protected against unauthorized access. Encryptions which are, for example, password-protected are normally used for this purpose. Authorized users can enter a password to open the file. However, this does not ensure that no further copies exist following a deletion. Authorized users who, for example, are being blackmailed, are also not prevented from sending the file to unauthorized third parties.

It could therefore be helpful to produce a method of increasing the security of files.

SUMMARY

I provide a method of destroying file contents of a file including storing the file in a predefined file format; integrating an algorithm that destroys file contents and has predefined trigger criteria into the file; checking the predefined trigger criteria when the file is opened; destroying file contents if at least one predefined trigger criterion is satisfied; and modifying the integrated algorithm if the predefined trigger criteria are not satisfied, wherein a first part of the algorithm is integrated into a first part of the file called by an executing program or an executing operating system when the file is opened, and modifying of the integrated algorithm includes modifying the storage structure of the algorithm so that it occurs in changed form after the opening of the file and cannot be recognized as before.

I also provide a method of destroying file contents of a file including storing the file in a predefined file format; integrating an algorithm that destroys file contents and has predefined trigger criteria into the file; checking the predefined trigger criteria when the file is opened; destroying file contents if at least one predefined trigger criterion is satisfied; and modifying the integrated algorithm if the predefined trigger criteria are not satisfied, wherein the integrated algorithm completely prevents an opening of the file, if the file is stored on a non-writeable medium so that the file cannot be modified.

I further provide a method of destroying file contents of a file including storing the file in a predefined file format; integrating an algorithm that destroys file contents and has predefined trigger criteria into the file; checking the predefined trigger criteria when the file is opened; destroying file contents if at least one predefined trigger criterion is satisfied; and modifying the integrated algorithm if the predefined trigger criteria are not satisfied, wherein the integrated algorithm prevents the file from being copied onto specific media in that a copying of the file with specific program types is not permitted.

I also further provide a method of destroying file contents of a file including storing the file in a predefined file format; integrating an algorithm that destroys file contents and has predefined trigger criteria into the file; checking the predefined trigger criteria when the file is opened; destroying file contents if at least one predefined trigger criterion is satisfied; and modifying the integrated algorithm if the predefined trigger criteria are not satisfied, wherein a first part of the algorithm is integrated into a pre-execution header of the file called by an executing program or an executing operating system when the file is opened and a second part of the algorithm is integrated into a second part of the file, called by the first part of the algorithm when the first part of the algorithm is called by the executing program or the executing operating system, and modifying of the integrated algorithm includes modifying a storage structure of the algorithm so that it occurs in changed form after the opening of the file and cannot be recognized as before and storing the modified algorithm in the file.

I also further provide a method of destroying file contents of a file including storing the file in a predefined file format; integrating an algorithm that destroys file contents and has predefined trigger criteria into the file; checking the predefined trigger criteria when the file is opened; destroying file contents if at least one predefined trigger criterion is satisfied; and modifying the integrated algorithm if the predefined trigger criteria are not satisfied, wherein the integrated algorithm further prevents the file from being copied onto specific media in that a copying of the file with specific program types is not permitted, and modifying the integrated algorithm includes modifying a storage structure of the algorithm so that it occurs in changed form after the opening of the file and cannot be recognized as before and storing the modified algorithm in the file.

I also further provide a method of destroying file contents of a file including storing the file in a predefined file format with an integrated algorithm that destroys file contents and has predefined trigger criteria; checking the predefined trigger criteria when the file is opened; destroying file contents if at least one predefined trigger criterion is satisfied; and modifying the integrated algorithm if the predefined trigger criteria are not satisfied, wherein a first part of the algorithm is integrated into a pre-execution header of the file called by an executing program or an executing operating system when the file is opened and a second part of the algorithm is integrated into a second part of the file, called by the first part of the algorithm when the first part of the algorithms called by the executing program or the executing operating system, modifying of the integrated algorithm includes modifying a storage structure of the algorithm so that it occurs in changed form after the opening of the file and cannot be recognized as before and storing the modified algorithm in the file, and the file consists of code stored at binary level as bits and the destruction of file contents includes modification of individual bits of the code of the file such that the file only becomes unusable after the file has been opened and trigger criteria have been satisfied for a predetermined number of times.

BRIEF DESCRIPTION OF THE DRAWING

FIG. 1 shows a flow diagram according to one design of the method.

DETAILED DESCRIPTION

We provide a method of destroying file contents in a file. The method comprises the following steps:
  storing the file in a predefined file format;
  integrating an algorithm that destroys file contents and has predefined trigger criteria into the file;
  checking the predefined trigger criteria when the file is opened; and
  destroying file contents if at least one predefined trigger criterion is satisfied.

Since a trigger criterion is checked with each opening, it is thus ensured that the file cannot be opened without carrying out a check on the trigger criteria. If a trigger criterion is satisfied, file contents are destroyed. This effectively prevents the file from being able to be used.

Advantageously, the following step may additionally be carried out:
modifying the integrated algorithm if the predefined trigger criteria are not satisfied.

Modification of the algorithm similarly comprises a storage of the modified algorithm in the file. A plurality of advantages are gained by modifying the integrated algorithm, known as a polymorphic algorithm. On the one hand, the algorithm can update and store relevant data for checking the predefined trigger criterion. The integrated algorithm can thus check with each opening whether the predefined trigger criteria are satisfied, depending on the stored data. In addition, it is possible for the algorithm to be modified such that it hinders an unauthorized user from deleting or modifying the integrated algorithm.

The predefined trigger criteria may comprise a checking of one or more of the following parameters: date; time zone; regional data; make of a device on which the file is opened; serial number of a device on which the file is opened; time after opening the file; identifier of a user of a device on which the file is opened.

The file can be destroyed after a specific time by checking the date. By checking the time zone or the regional data, it can be ensured that the file can be read only by users in a specific region or time zone. For example, the integrated algorithm is triggered to destroy the file contents if the file is sent by a user from Europe to the USA. To do this, the algorithm checks, for example, a system time zone of an operating system and/or a country setting. If the file is then opened in the USA, the integrated algorithm detects the changed time zone or the different country and carries out the step of destroying file contents. In this way, the file can similarly be restricted to specific users or devices. For example, by the serial number of a device.

Destruction of file contents may comprise a modification of bits of a code of the file. As a result, it is ensured that the file is modified or destroyed not only at a higher level. Through the modification of individual bits of the code of the file, it is ensured at the lowest level that the file has been modified. If the modification of the bits is great enough, or if a sufficient number of bits of the file have been modified, the file is destroyed.

Destruction of file contents may be based on a random algorithm, wherein the destruction is irreversible. It is thereby ensured that a user wishing to recover the file cannot establish an inverse rule from a possible read-out of the integrated algorithm to reverse the modification of the file contents.

An information-bearing part of the code may be destroyed in the step of destroying file contents so that an information content of the file is destroyed.

Since files are often made up of different file segments such as, for example, in container files, it is not absolutely necessary to destroy all parts of the code of the file to make the file unusable or unreadable for a user. The destruction of file contents can therefore be restricted to those parts of the file code which stores information. Information in this sense comprises information from which conclusions regarding contents of the file are identifiable.

A first part of the algorithm may be integrated into a first part of the file which is called by an executing program when the file is opened.

It is hereby ensured that the algorithm is executed when the file is opened. The first part of the file may be a "pre-execution header." This can be executed independently from the operating system at the start of an opening of a file.

Alternatively, a first part of the algorithm may be integrated into a first part of the file which is called by an executing operating system when the file is opened.

It is hereby similarly ensured that the algorithm is executed when the file is opened.

A second part of the algorithm may be integrated into a second part of the file and can be called by the first part of the algorithm. The algorithm may exceed a specific size and a specific memory requirement which would be too large for the first part of the file. As a result, it can be ensured that the algorithm can store and/or modify data without the functionality of the file being attacked. The first part of the algorithm can call the second part of the algorithm stored in the second part of the file.

Our methods are explained in detail below with reference to examples and FIG. 1.

FIG. 1 shows a flow diagram 10. The file is stored in step 11 of the flow diagram 10. The file may be a text file that is stored, for example, in a file format of the word-processing program such as, for example, .doc or .docx. However, it is equally possible for the files to be .pdf files or other files.

In step 12, an algorithm that destroys file contents is then integrated. Integration of the algorithm that destroys file contents can be performed here by a computer program developed specifically for this purpose. However, it is similarly conceivable for integration of the algorithm that destroys file contents to be performed by the same program that created the file in step 11. In the integration, a first part of the algorithm is written to a first part of the file. The first part of the file is the pre-execution header. For example, programs under the UNIX, Linux, Microsoft Windows, iOS operating systems open files with the pre-execution header. Integration of the algorithm into the file is thus independent from the operating system. When the file is opened, the pre-execution header is called by programs reading the file at the start of the opening. Since this first part of the file has a limited storage capacity only, the entire code of the algorithm cannot be integrated therein. A first part of the algorithm is integrated into the first part of the file which serves to call a second part of the algorithm which is stored in a part of the file of which the storage capacity is not so strictly limited. It is thus ensured that the pre-execution header does not exceed a restricting storage size.

Alternatively, step 11 and step 12, the storage and integration, coincide. When the file is stored, the algorithm that destroys file contents is integrated into the file. Integration of the algorithm takes place here in two parts, in the same way as described for step 12.

Division of the algorithm into two parts is obviously not limiting for the performance of our methods. In other designs, the algorithm can be integrated in undivided form (if the file format used has no storage size restriction or the algorithm code is small enough not to exceed the size), or is divided into a plurality of parts that are called accordingly. The algorithm is additionally protected against detection.

If the file is opened by a program, step 13 is automatically carried out. When the file is opened, the pre-execution header is first executed. In step 13, a second part of the algorithm is called in the first part of the algorithm.

Checking the predefined trigger criteria is automatically triggered by opening the file and the performance of step 13. The integrated algorithm has predefined trigger criteria. A date and a time zone are used as parameters in the example.

The date is selected here by a user such that it occurs six months after creation of the file. The Berlin time zone is used in the example. Alternatively, other parameters can be checked as a trigger criterion. For example, a serial number of a device is checked as a trigger criterion. Step 14 is carried out as soon as a different serial number is detected. In a further alternative or additional design, a time after the opening of the file is checked as the trigger criterion. The integrated algorithm thus calls step 14 after, for example, 20 seconds following opening of the file, and thus destroys file contents. If it is detected here that the predefined trigger criteria are satisfied, step 14 is then carried out. The algorithm is set using the predefined trigger criteria such that step 14 is carried out when either the set date is reached or the set time zone is left. Various parameter checks can generally be linked with one another as trigger criteria. The destruction of the file contents has a predefined scope.

In the example, file contents are destroyed in step 14. A random algorithm is executed which modifies individual bits of the file. Since the algorithm that destroys the file contents has a random basis, it is not reversible. Files essentially consist of code stored at binary level as bits. Due to modification of individual bits of the code of the file, the file is retained, but cannot be further used. The modified file structures are thus irretrievably lost.

In the example, destruction of the file structures is so great that the file cannot be further used. Alternatively, destruction of the file structures is less so that the file can be further used by a user and only becomes unusable after a predefined number of satisfied trigger criteria when the file is opened. For example, the algorithm modifies code in a specific file area only for this purpose. Alternatively or additionally, the modification is restricted to a predefined number of individual partial modifications. For example, the algorithm modifies only 1000 individual bits in each performance of step 14.

If no predefined trigger criterion is detected in step 13, the algorithm changes in step 15. The algorithm is thus a polymorphic algorithm. Additionally or alternatively, the algorithm changes if only single trigger criteria are detected. A change may comprise an updating of a time zone, a date or a serial number. An algorithm change may similarly comprise a change in the storage structure of the algorithm so that it occurs in changed form after the opening of the file and cannot be recognized as before. The security of the algorithm is thus further increased.

If the file is stored on a non-writable medium so that the file code cannot be modified, the algorithm completely prevents an opening of the file. In a further design, the algorithm additionally prevents the file from being copied onto specific media in that a copying of the file with specific program types such as burning programs is not permitted.

The invention claimed is:

1. A method of destroying file contents of a file comprising:
   storing the file in a predefined file format;
   integrating an algorithm that destroys file contents and has predefined trigger criteria into the file, wherein the integrated algorithm is a polymorphic algorithm;
   checking the predefined trigger criteria when the file is opened;
   destroying file contents if at least one predefined trigger criterion is satisfied; and
   modifying, with each opening of the file, the integrated algorithm if the predefined trigger criteria are not satisfied,
   wherein a first part of the algorithm is integrated into a pre-execution header of the file called by an executing program or an executing operating system when the file is opened and a second part of the algorithm is integrated into a second part of the file, called by the first part of the algorithm when the first part of the algorithm is called by the executing program or the executing operating system, and
   modifying of the integrated algorithm comprises modifying a storage structure of the algorithm so that it occurs in changed form after the opening of the file and cannot be recognized as before and storing the modified algorithm in the file.

2. The method according to claim 1, wherein the predefined trigger criteria comprise a checking of one or more of the following parameters: date; time zone; regional data; make of a device on which the file is opened; serial number of a device on which the file is opened; time after opening the file; identifier of a user of a device on which the file is opened.

3. The method according to claim 1, wherein the file consists of code stored at binary level as bits and the destruction of file contents comprises modification of individual bits of the code of the file such that the file only becomes unusable after a predefined number of satisfied trigger criteria when the file is opened.

4. The method according to claim 1, wherein the destruction of file contents is based on a random algorithm and the destruction is irreversible.

5. The method according to claim 1, wherein an information-bearing part of the file is destroyed in destroying file contents so that an information content of the file is destroyed.

6. A method of destroying file contents of a file comprising:
   storing the file in a predefined file format;
   integrating an algorithm that destroys file contents and has predefined trigger criteria into the file, wherein the integrated algorithm is a polymorphic algorithm;
   checking the predefined trigger criteria when the file is opened;
   destroying file contents if at least one predefined trigger criterion is satisfied; and
   modifying, with each opening of the file, the integrated algorithm if the predefined trigger criteria are not satisfied,
   wherein the integrated algorithm further prevents the file from being copied onto specific media in that a copying of the file with specific program types is not permitted,
   modifying the integrated algorithm comprises modifying a storage structure of the algorithm so that it occurs in changed form after the opening of the file and cannot be recognized as before and storing the modified algorithm in the file, and
   a first part of the algorithm is integrated into a pre-execution header of the file called by an executing program or an executing operating system when the file is opened and a second part of the algorithm is integrated into a second part of the file, called by the first part of the algorithm when the first part of the algorithm is called by the executing program or the executing operating system.

7. The method according to claim 6, wherein the predefined trigger criteria comprise a checking of one or more of the following parameters: date; time zone; regional data; make of a device on which the file is opened; serial number of a device on which the file is opened; time after opening the file; identifier of a user of a device on which the file is opened.

8. The method according to claim 6, wherein the file consists of code stored at binary level as bits and the destruction of file contents comprises a modification of individual bits of the code of the file such that the file only becomes unusable after a predefined number of satisfied trigger criteria when the file is opened.

9. The method according to claim 6, wherein the destruction of file contents is based on a random algorithm and the destruction is irreversible.

10. The method according to claim 6, wherein an information-bearing part of the file is destroyed in the step of destroying file contents, so that an information content of the file is destroyed.

11. A method of destroying file contents of a file comprising:
   storing the file in a predefined file format with an integrated algorithm that destroys file contents and has predefined trigger criteria, wherein the integrated algorithm is a polymorphic algorithm;
   checking the predefined trigger criteria when the file is opened;
   destroying file contents if at least one predefined trigger criterion is satisfied; and
   modifying, with each opening of the file, the integrated algorithm if the predefined trigger criteria are not satisfied,
   wherein a first part of the algorithm is integrated into a pre-execution header of the file called by an executing program or an executing operating system when the file is opened and a second part of the algorithm is integrated into a second part of the file, called by the first part of the algorithm when the first part of the algorithm is called by the executing program or the executing operating system,
   modifying of the integrated algorithm comprises modifying a storage structure of the algorithm so that it occurs in changed form after the opening of the file and cannot be recognized as before and storing the modified algorithm in the file, and
   the file consists of code stored at binary level as bits and the destruction of file contents comprises modification of individual bits of the code of the file such that the file only becomes unusable after the file has been opened and trigger criteria have been satisfied for a predetermined number of times.

12. The method according to claim 11, wherein the predefined trigger criteria comprise a checking of one or more of the following parameters: date; time zone; regional data; make of a device on which the file is opened; serial number of a device on which the file is opened; time after opening the file; identifier of a user of a device on which the file is opened.

13. The method according to claim 11, wherein the modification of individual bits of the code of the file is restricted to a modification of a predefined number of individual bits of the code of the file.

14. The method according to claim 11, wherein an information-bearing part of the code is destroyed in destroying file contents so that an information content of the file is destroyed.

* * * * *